UNITED STATES PATENT OFFICE.

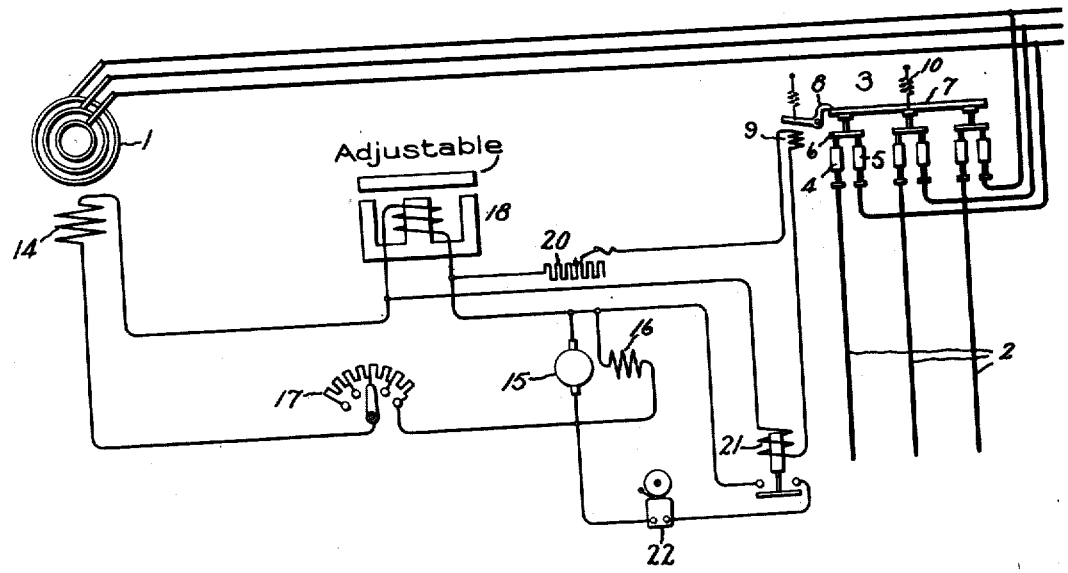

WILLIAM F. DAWSON, OF LYNN, MASSACHUSETTS, ASSIGNOR TO GENERAL ELECTRIC COMPANY, A CORPORATION OF NEW YORK.

APPARATUS FOR PROTECTING THE FIELD STRUCTURE AND WINDINGS OF DYNAMO-ELECTRIC MACHINES.

1,381,086.

Specification of Letters Patent. Patented June 7, 1921.

Application filed June 16, 1919. Serial No. 304,718.

*To all whom it may concern:*

Be it known that I, WILLIAM F. DAWSON, a citizen of the United States, residing at Lynn, in the county of Essex, State of Massachusetts, have invented certain new and useful Improvements in Apparatus for Protecting the Field Structure and Windings of Dynamo-Electric Machines, of which the following is a specification.

My invention relates to apparatus for the protection of the field structure and windings of a dynamo electric machine supplying a distribution circuit from the injurious effects of the voltage induced in field structure and windings by the presence of abnormal conditions on the distribution circuit.

My invention is especially applicable to the protection of the field structure and windings of a polyphase alternating current generator from the injurious effects of operating the polyphase generator with the phases badly unbalanced, as may be the case when a single phase load is being supplied. When the phases are unbalanced, a voltage of double the normal frequency is induced in the field winding, and the more the phases are unbalanced the larger is this induced voltage. This induced voltage may become so large as to break down the insulation of the field winding and produce a short circuit, causing serious damage to the field winding. Furthermore, the eddy currents in the field structure caused by this induced voltage may produce excessive and disastrous heating.

The object of my invention is to prevent the field structure and windings of the dynamo electric machine being damaged by the presence of such abnormal conditions on the distribution circuit. In accordance with this object I provide means responsive to the current produced by the voltage induced in the field circuit by the abnormal conditions for rendering the dynamo electric machine inoperative to supply current to the distribution circuit.

The single figure of the accompanying drawing is a diagrammatic view of a polyphase system of distribution showing one embodiment of my invention.

Referring to the drawing, polyphase current is supplied from the polyphase generator 1 to the polyphase distribution circuit 2 through the oil switch 3. This oil switch may be of any well-known type. The particular type shown in the drawing consists of stationary contact members 4 and 5, movable contact members 6 carried by a bar 7 and arranged to connect the contact members 4 and 5 to complete the circuit between the generator 1 and the distribution circuit 2, the latch 8 arranged to hold the oil switch closed, a tripping coil 9 for releasing the latch 8, a spring 10 arranged to be under tension when the oil switch is closed so as to open the oil switch when the latch is released, and means (not shown) for closing the oil switch. The closing means usually consists of a magnet arranged when energized to move the bar 7 so as to bring the movable contact members 6 into engagement with the contact members 4 and 5. No closing means is shown in the drawing because it does not constitute a part of this invention.

The generator 1 is provided with a field winding 14 connected to the direct current exciter 15, which is provided with a shunt field winding 16. I have shown an adjustable resistance 17 connected in series with the generator field circuit so that the exciting current can be readily adjusted to any desired value.

In the field circuit of the generator, I provide suitable means, which is responsive to pulsating current, but is not affected by direct current, for rendering the dynamo electric machine 1 inoperative to supply current to the distribution circuit 2 in case the voltage induced in the field winding of the dynamo electric machine by abnormal conditions in the distribution circuit exceeds a predetermined value. In the specific embodiment of my invention shown in the drawing, this means comprises an inductive device such as a reactor 18 connected in series with the field winding of the generator and a tripping coil 9 for the oil circuit breaker 3 connected in shunt with the reactor. This reactor may be of any well-known construction but I prefer to use the construction shown in the drawing, namely an E-shaped core with the winding, which consists of a few turns, on the middle leg of the core and an armature adjustable relative to the core so that the reluctance of the magnetic circuit can be readily adjusted to any desired value.

The resistance of the tripping coil is much larger than the resistance of the reactor 18, whereas the reactance of the tripping coil is very small. In order to adjust the resistance of the tripping coil 9 I prefer to insert a variable series resistance 20 in the circuit thereof. The resistance of the reactor is made small so that the voltage across the terminals is low under normal conditions as only direct current flows through the field circuit. If, however, there is a bad unbalancing of the phases, the field winding 14 will have a voltage of double the normal frequency induced therein. This induced voltage causes an alternating current of the same frequency to flow through the field circuit, thereby increasing the reactance of the reactor 18. Consequently the voltage drop across the reactor increases so that the voltage across the terminals of the tripping coil 9 is also increased, causing more current to flow through the tripping coil 9. By properly adjusting the air gap of the reactor 18 and the resistance 20 the tripping coil 9 can be made to trip open the oil switch 3 when the magnitude of the voltage induced in the field approaches a dangerous value thereby rendering the dynamo electric machine 1 inoperative to supply current to the distribution circuit 2. In this way I am able to prevent the induced voltage from damaging the field winding, and the field structure being damaged by the eddy currents set up by the double frequency voltage. I also prefer to insert a relay 21 in series with the tripping coil 9. This relay is designed to respond to a smaller current than the tripping coil 9, and when operated closes a circuit for the signal 22. In this way a signal is operated before the oil switch is opened, and therefore will give the operator a chance to clear the circuits from unbalanced operation before the oil switch trips out.

While I have illustrated and described a reactor in the field circuit it will be obvious to those skilled in the art that my invention is not limited to such voltage producing means but contemplates the provision of any device or combination of devices and circuits for performing a similar function in the combination.

It will also be obvious to those skilled in the art that my invention is not limited to the particular arrangement shown for rendering the generator inoperative to supply current to the distribution circuit, but contemplates the utilization of any means which will perform this function in the combination. I intend therefore to cover all such modifications and variations as fall within the spirit of my invention the scope of which is defined in the appended claims.

What I claim as new and desire to secure by Letters Patent of the United States, is:—

1. In combination, a distribution circuit, a dynamo electric machine supplying electrical energy thereto, and means responsive to the current produced by the voltages induced in the field windings of said machine by abnormal conditions in said distribution circuit for disconnecting said machine from said distribution circuit.

2. In combination, a polyphase distribution circuit, a polyphase generator supplying electrical energy thereto, and means responsive to the current produced by the voltage induced in the field windings of said machine by a predetermined unbalancing of the phases for disconnecting said generator from said distribution circuit.

3. In combination, a distribution circuit, a dynamo electric machine supplying electrical energy thereto, and an interrupter for disconnecting said machine from said distribution circuit comprising relatively movable contact members, a reactor in the field circuit of said machine, and a trip coil connected in shunt relation to said reactor and arranged to separate said contact members when the current produced by the voltage induced in said field circuit by abnormal conditions in said distribution circuit exceeds a predetermined amount.

4. In combination, a polyphase distribution circuit, a polyphase generator supplying electrical energy thereto, and an interrupter for disconnecting said machine from said distribution circuit comprising relatively movable contact members, a reactor in the field circuit of said generator, and a trip coil connected in shunt relation to said reactor and arranged to be operated by the current produced by the voltage induced in said field circuit by a predetermined unbalancing of the phases to separate said contact members.

5. In combination, a polyphase distribution circuit, a polyphase generator supplying electrical energy thereto, a reactor connected in the field circuit of said generator, and an electromagnetic device connected in shunt relation to said reactor and arranged to be operated by the current produced by the voltage induced in said field circuit by a predetermined unbalancing of the phases.

6. In combination, a polyphase distribution circuit, a polyphase generator supplying electrical energy thereto, and means responsive to the electromotive force induced in the field circuit of said generator by the unbalancing of the phases of said distribution circuit for rendering the generator inoperative to supply current to said distribution circuit.

7. In combination, a polyphase distribution circuit, a polyphase generator supplying electrical energy thereto, an inductive device connected in the field circuit of said generator, and an electromagnetic device connected to said inductive device and arranged to be operated in response to the voltage induced in said field circuit by a predetermined unbalancing of the phases of said distribution circuit.

In witness whereof I have hereunto set my hand this 13th day of June, 1919.

WILLIAM F. DAWSON.